United States Patent
Hashimoto (10) Patent No.: US 11,760,356 B2
(45) Date of Patent: Sep. 19, 2023

(54) LANE CHANGE PLANNING DEVICE AND STORAGE MEDIUM STORING COMPUTER PROGRAM FOR THE SAME

(71) Applicant: TOYOTA JIDOSHA KABUSHIKI KAISHA, Toyota (JP)

(72) Inventor: Ryuta Hashimoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 17/363,697

(22) Filed: Jun. 30, 2021

(65) Prior Publication Data
US 2022/0001867 A1 Jan. 6, 2022

(30) Foreign Application Priority Data
Jul. 1, 2020 (JP) .................................. 2020-113928

(51) Int. Cl.
*B60W 30/18* (2012.01)
*B60W 60/00* (2020.01)

(52) U.S. Cl.
CPC .. *B60W 30/18163* (2013.01); *B60W 60/0053* (2020.02); *B60W 2552/10* (2020.02); *B60W 2556/50* (2020.02)

(58) Field of Classification Search
CPC ....... B60W 30/18163; B60W 60/0053; B60W 2552/10; B60W 2556/50; B60W 30/18154; B60W 60/001
See application file for complete search history.

(56) References Cited

U.S. PATENT DOCUMENTS

| | | | |
|---|---|---|---|
| 10,906,555 B2* | 2/2021 | Yamamoto | B60W 30/18163 |
| 2012/0083964 A1 | 4/2012 | Montemerlo et al. | |
| 2019/0039627 A1* | 2/2019 | Yamamoto | B60W 60/0053 |
| 2019/0061765 A1* | 2/2019 | Marden | B60W 30/18163 |
| 2019/0212749 A1* | 7/2019 | Chen | B62D 15/02 |
| 2020/0217685 A1* | 7/2020 | Koh | G01C 21/3602 |
| 2021/0139044 A1* | 5/2021 | Ishioka | B60R 21/00 |
| 2021/0148725 A1 | 5/2021 | Watahiki et al. | |
| 2021/0163011 A1* | 6/2021 | Maru | G08G 1/167 |
| 2021/0192956 A1* | 6/2021 | Takeda | G08G 1/167 |
| 2021/0197845 A1* | 7/2021 | Mimura | B60R 16/02 |
| 2022/0001867 A1* | 1/2022 | Hashimoto | B60W 30/18163 |
| 2022/0262253 A1* | 8/2022 | Wu | H04B 7/0695 |

FOREIGN PATENT DOCUMENTS

| | | |
|---|---|---|
| JP | 2006-178714 A | 7/2006 |
| JP | 2017-090410 A | 5/2017 |
| WO | 2019/198481 A1 | 10/2019 |

\* cited by examiner

*Primary Examiner* — Peter D Nolan
*Assistant Examiner* — Ashley L Redhead, Jr.
(74) *Attorney, Agent, or Firm* — Sughrue Mion, PLLC (57) ABSTRACT

A lane change planning device has a processor configured to assess whether or not it has been planned to carry out multiple lane changes within a single road, based on a traveling lane plan that represents a lane on which a vehicle is scheduled to travel within a predetermined zone of a traveling route toward the destination location of the vehicle, and to create a lane change plan such that a first scheduled lane change zone that the vehicle has been assigned for a lane change to be carried out afterwards, is shorter than a second scheduled lane change zone that has been assigned for a lane change to be carried out beforehand, when it has been planned to carry out multiple lane changes within a single road.

9 Claims, 9 Drawing Sheets

LANE CHANGE PLANNING DEVICE AND STORAGE MEDIUM STORING COMPUTER PROGRAM FOR THE SAME

FIELD

The present invention relates to a lane change planning device and a storage medium that stores a computer program for lane change planning.

BACKGROUND

An automatic control device mounted in a vehicle creates a traveling route for the vehicle, based on the current location of the vehicle, the destination location of the vehicle, and map information, and controls the vehicle so that it travels along the traveling route.

When the traveling route includes a branching location where the vehicle is to move from the road on which it is currently traveling to another road that branches ahead, the automatic control device controls the vehicle so that it moves from the traveling road to the other road at the branching location (see International Patent Publication No. 2019/198481, for example).

SUMMARY

When the vehicle is traveling on a single traffic lane (traveling lane) on a road which has three or more traffic lanes, there are sometimes one or more traffic lanes between the traveling lane and the traffic lane that connects with the other road at the branching location. In such cases, the vehicle must make a lane change two or more times to move from the current traveling lane to the traffic lane connecting with the other road (hereunder also referred to as "target lane").

When the vehicle begins the lane change from a location far before the branching location, the behavior of the vehicle can potentially cause the driver to feel uncomfortable. In addition, since the automatic control device controls operation so that a safe distance is maintained between the vehicle and other vehicles while the lane change is being executed, it cannot execute the lane change if it appears that a safe distance cannot be ensured between the vehicle and other vehicles. In other words, if the location where the vehicle is to begin the lane change is too close to the branching location, the presence of other vehicles may make it impossible to complete all of the lane changes before the branching location is reached. It is therefore preferable for multiple lane changes to be carried out by the vehicle in a manner that does not create an uncomfortable feeling for the driver.

It is an object of the present invention to provide a lane change planning device that creates a lane change plan in a manner so that the driver feels that the vehicle is smoothly carrying out multiple lane changes toward the target lane, when it is planned to execute multiple lane changes within a single road.

One embodiment of the invention provides a lane change planning device. The lane change planning device has an assessment unit that assesses whether or not it has been planned to carry out multiple lane changes within a single road, based on a traveling lane plan that represents a lane on which a vehicle is scheduled to travel within a predetermined zone of a traveling route toward the destination location of the vehicle, and a lane change planning unit that creates a lane change plan such that a first scheduled lane change zone that the vehicle has been assigned for a lane change to be carried out afterwards, is shorter than a second scheduled lane change zone that has been assigned for a lane change to be carried out beforehand, when it has been planned to carry out multiple lane changes within a single road.

In this lane change planning device, it is preferred that the lane change planning unit creates the lane change plan in a manner so that the distance between the start location of the first scheduled lane change zone and the start location of the second scheduled lane change zone is shorter as a larger number of lane changes have been executed.

In this lane change planning device, it is preferred that the lane change planning device further has an end location setting unit that sets a scheduled location of lane change completion where the multiple lane changes are to be completed, on a destination target lane after the multiple lane changes have been carried out from the traveling lane on which the vehicle is currently traveling, based on the traveling route and the traveling lane plan, and wherein the lane change planning unit sets the start location of the first scheduled lane change zone and the start location of the second scheduled lane change zone on a traffic lane based on the scheduled location of lane change completion.

In this lane change planning device, it is preferred that the lane change planning unit sets the end location of the first scheduled lane change zone and the end location of the second scheduled lane change zone on the traffic lane, based on the scheduled location of lane change completion.

In this lane change planning device, it is preferred that the lane change planning device further has a control change unit that switches operation of the vehicle from automatic control to manual control when the vehicle cannot carry out the lane change even after passing the first scheduled lane change zone or the second scheduled lane change zone.

Another embodiment of the invention provides a lane change planning device. The lane change planning device has an assessment unit that assesses whether or not it has been planned to carry out multiple lane changes within a single road, based on a traveling lane plan that represents a lane on which a vehicle is scheduled to travel within a predetermined zone of a traveling route toward the destination location of the vehicle, and a lane change planning unit that creates a lane change plan such that the scheduled lane change zone that the vehicle has been assigned for the lane change before the lane change has begun is shorter as a larger number of lane changes have been executed, when it has been planned to carry out multiple lane changes within a single road.

According to another embodiment, a computer-readable non-transitory storage medium that stores a computer program for lane change planning is provided. The computer program for lane change planning causes a processor to assess whether or not it has been planned to carry out multiple lane changes within a single road, based on a traveling lane plan that represents a lane on which a vehicle is to travel within a predetermined zone of a traveling route toward the destination location of the vehicle, and to create a lane change plan such that a first scheduled lane change zone that the vehicle has been assigned for a lane change to be carried out afterwards, is shorter than a second scheduled lane change zone that has been assigned for a lane change to be carried out beforehand, when it has been planned to carry out multiple lane changes within a single road.

Another embodiment of the invention provides a lane change planning method. In the lane change planning method, a lane change planning device executes to assess whether or not it has been planned to carry out multiple lane changes within a single road, based on a traveling lane plan that represents a lane on which a vehicle is to travel within a predetermined zone of a traveling route toward the destination location of the vehicle, and create a lane change plan such that a first scheduled lane change zone that the vehicle has been assigned for a lane change to be carried out afterwards, is shorter than a second scheduled lane change zone that has been assigned for a lane change to be carried out beforehand, when it has been planned to carry out multiple lane changes within a single road.

The lane change planning device of the invention can create a lane change plan in a manner so that the driver feels that the vehicle is smoothly carrying out multiple lane changes toward the target lane, when it is planned to carry out multiple lane changes within a single road.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
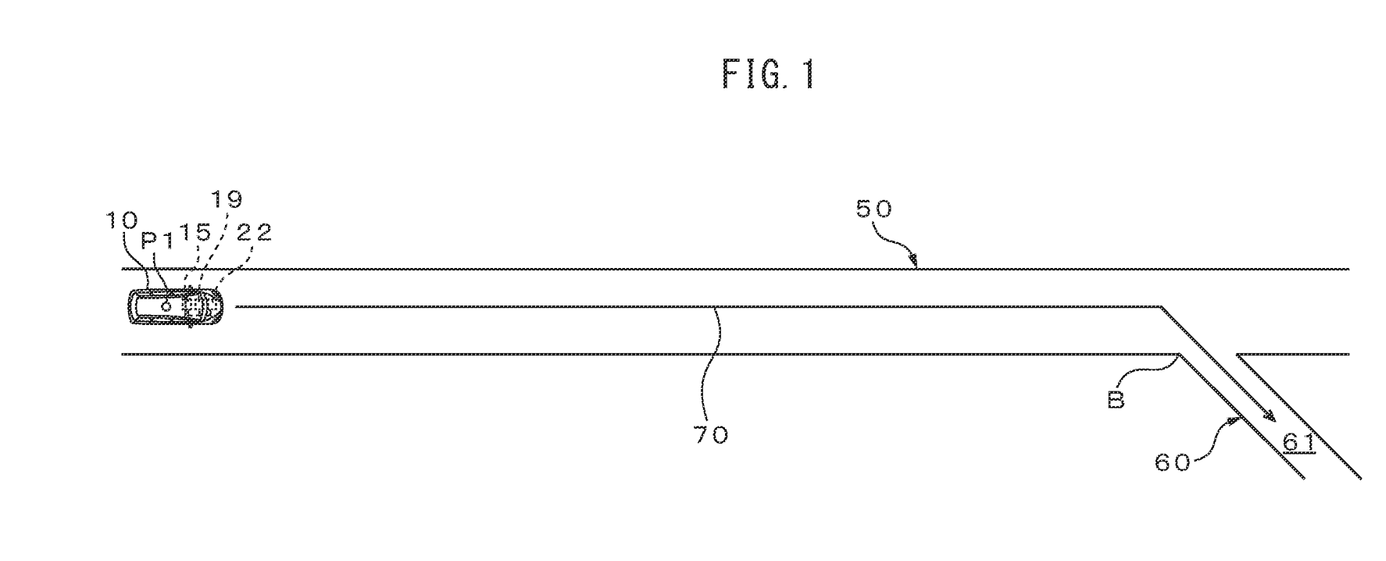
FIG. 1 is a diagram illustrating operation of the lane change planning device in overview (1).
Figure 2:
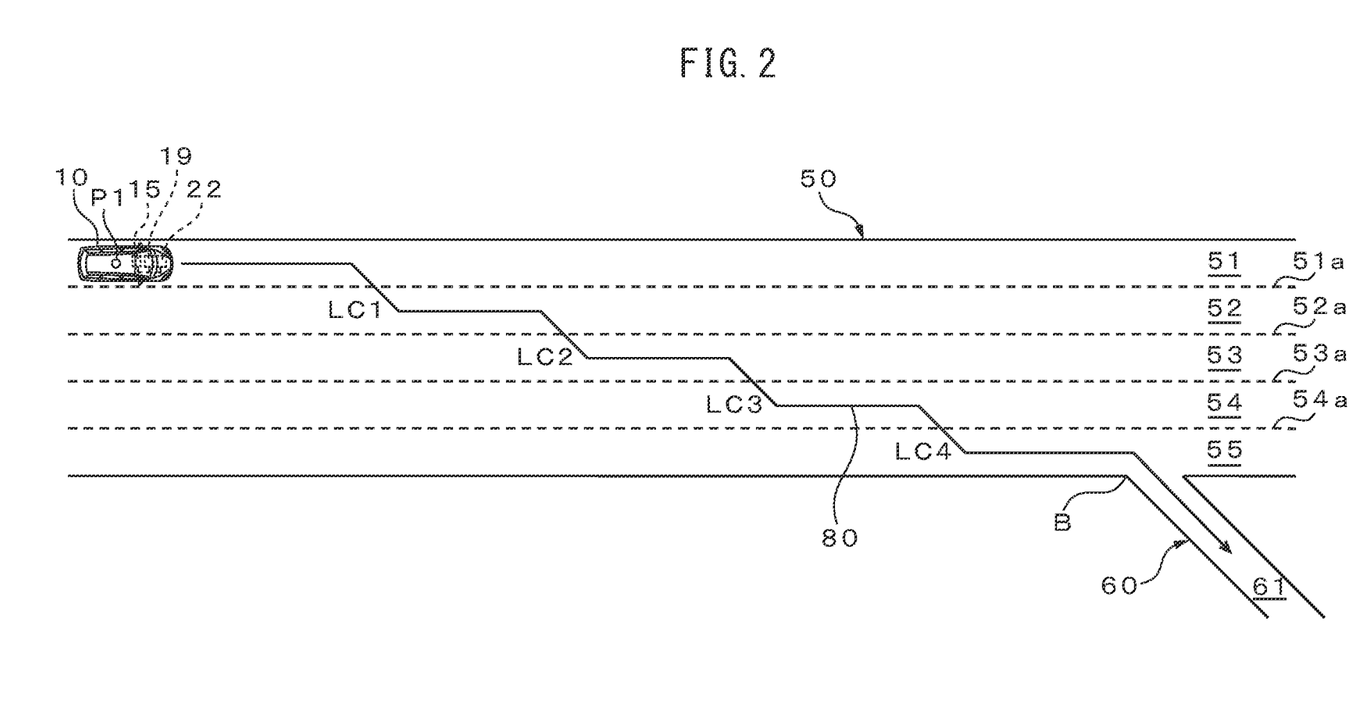
FIG. 2 is a diagram illustrating operation of the lane change planning device in overview (2).
Figure 3:
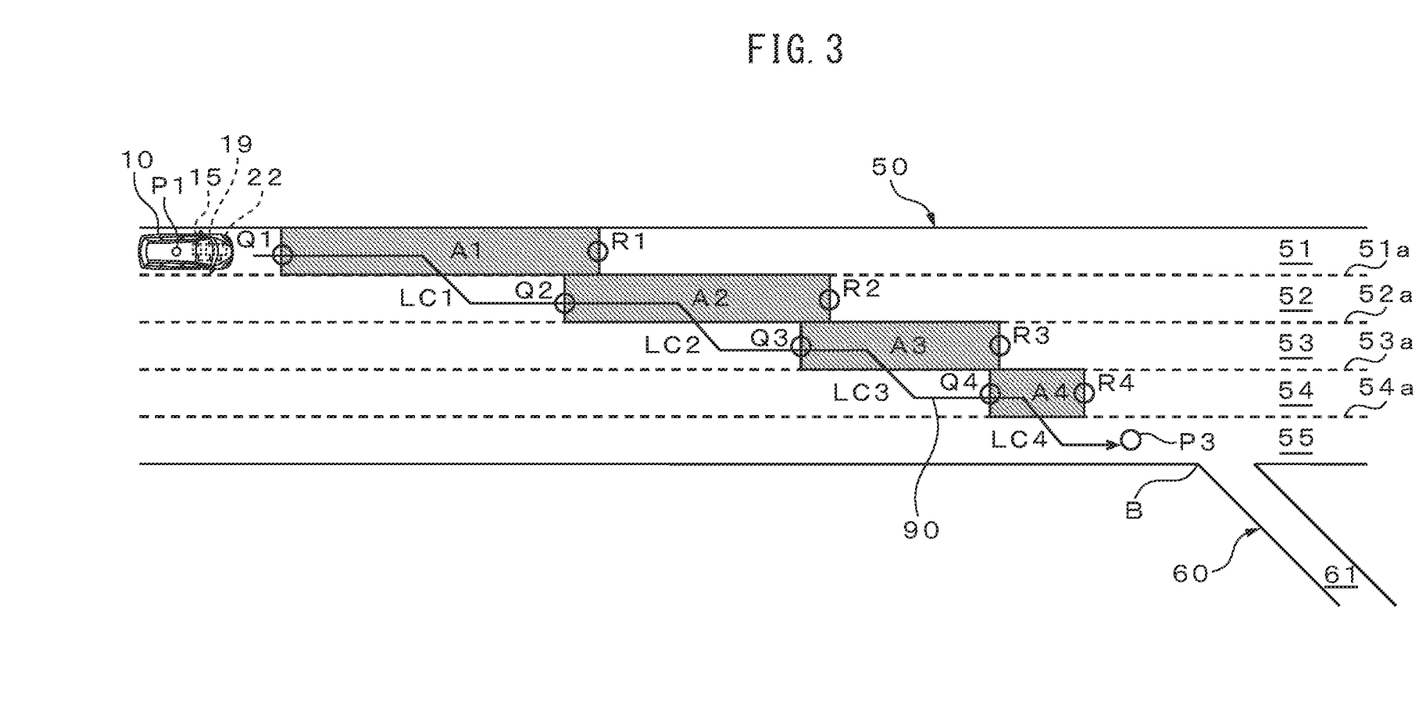
FIG. 3 is a diagram illustrating operation of the lane change planning device in overview (3).

FIG. 1 to FIG. 3 are diagrams illustrating operation of a lane change planning device in overview. Operation of the lane change planning device disclosed herein will now be described in overview with reference to FIG. 1 to FIG. 3.

FIG. 1 shows an example of a traveling route 70 created by a navigation device 15, where an automatically controlled vehicle 10 is currently traveling on a road 50 at a location P1, and is expected to exit from a branching location B onto a side road 60. Information relating to the traffic lane is not included in the traveling route 70.

FIG. 2 shows an example of a traveling lane plan created by a traveling lane planning device 19, for the most recent driving zone of the traveling route 70 shown in FIG. 1. Since the actual road 50 has four lanes 51 to 54 and a target lane 55 connected with the branching location B, while the actual side road 60 has a single traffic lane 61, the traveling lane plan indicates that a lane change is to be carried out 4 times to move from the current traveling lane 51 to the side road 60, as indicated by 80 in the drawing.

FIG. 3 is an example of a lane change plan created by a lane change planning device 22 mounted in a vehicle 10, based on high-precision map information, a traveling route 70 and a traveling lane plan. In the lane change plan of FIG. 3, scheduled lane change zones A1 to A4 are set for four lane changes LC1 to LC4 from the current location P1, as a plan for movement to the target lane 55 before the scheduled location of lane change completion P3. The lane change plan shown in FIG. 3 is the basis for the vehicle 10 moving in the trajectory represented by 90.

Each of the scheduled lane change zones A1 to A4 have start locations Q1 to Q4 and end locations R1 to R4. For example, if another vehicle is traveling in the traffic lane 52 when the vehicle 10 attempts to execute a lane change from the traffic lane 51 to the traffic lane 52 immediately after the start location Q1 of the scheduled lane change zone A1, it may not necessarily be able to execute the lane change immediately after the start location Q1. The lane change planning device 22 creates a lane change plan in a manner so that a lane change by the vehicle 10 from the traffic lane 51 to the traffic lane 52 is acceptable within the scheduled lane change zone A1. For example, when the vehicle 10 has not executed a lane change to the traffic lane 52 even after having passed the end location R1, processing is carried out to alert the driver or to switch from automatic control to manual control.

The scheduled lane change zone A1 is set to be longer than the scheduled lane change zone A2, the scheduled lane change zone A2 is set to be longer than the scheduled lane change zone A3, and the scheduled lane change zone A3 is set to be longer than the scheduled lane change zone A4. That is, the scheduled lane change zones are set to be shorter as a larger number of lane changes have been executed, and closer to the target lane 55.

Each time the vehicle 10 makes a lane change from the traveling lane 51 in which it is currently traveling toward the target lane 55, it is affected by the state of other vehicles traveling in the traffic lanes ahead of the lane change, but the time lag until the next lane change begins becomes shorter on average. The driver therefore perceives that the vehicle 10 smoothly carries out the multiple lane changes from the traveling lane 51 toward the target lane 55.

Figure 4:
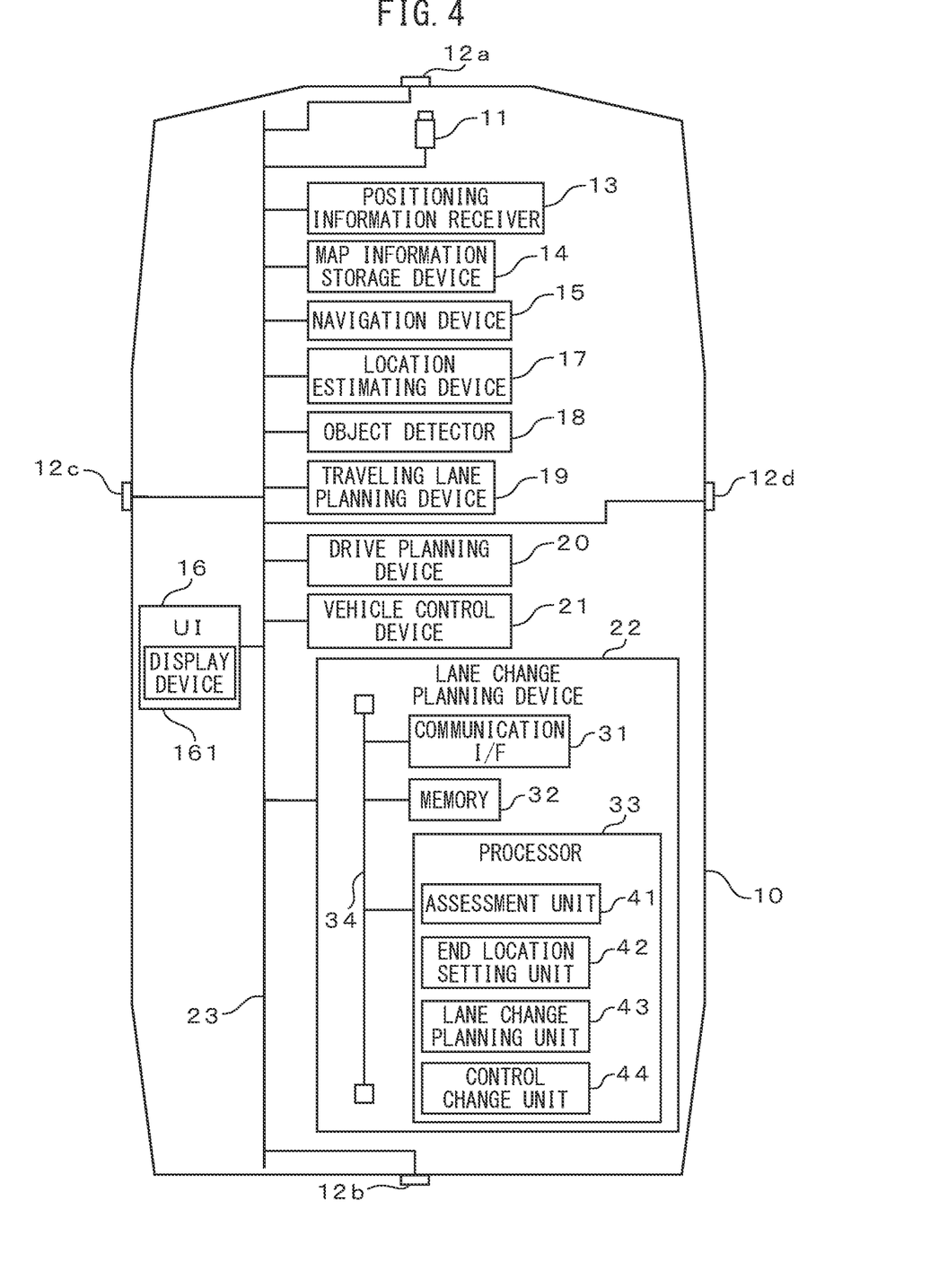
FIG. 4 is a general schematic drawing of a vehicle in which a lane change planning device is mounted.

FIG. 4 is a general schematic drawing of a vehicle 10 in which a lane change planning device 22 is mounted. The vehicle 10 has a camera 11, LiDAR sensors 12a to 12d, a positioning information receiver 13, a map information storage device 14, a navigation device 15, a user interface (UI) 16, a location estimating device 17, an object detector 18, a traveling lane planning device 19, a drive planning device 20, a vehicle control device 21 and a lane change planning device 22.

The camera 11, LiDAR sensors 12a to 12d, positioning information receiver 13, map information storage device 14, navigation device 15, UI 16, location estimating device 17, object detector 18, traveling lane planning device 19, drive planning device 20, vehicle control device 21 and lane change planning device 22 are connected in a communicable manner through an in-vehicle network 23 that conforms to controller area network standards.

The camera 11 is an example of an imaging unit provided in the vehicle 10. The camera 11 is mounted inside the vehicle 10 and directed toward the front of the vehicle 10. The camera 11, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 11 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 11 outputs the camera image and the camera image photograph time at which the camera image was taken, through the in-vehicle network 23 to the location estimating device 17 and object detector 18. The camera image is also used for processing at the location estimating device 17 to estimate the location of the vehicle 10. At the object detector 18, the camera image is used for processing to detect other objects surrounding the vehicle 10.

The LiDAR sensors 12a to 12d are mounted on the outer sides of the vehicle 10, for example, being directed toward the front, the left, the rear and the right of the vehicle 10, respectively. The LiDAR sensors 12a to 12d respectively synchronize and emit a pulsed laser ahead, to the left, behind and to the right of the vehicle 10, at a reflected wave information acquisition time set with a predetermined cycle, and receive a reflected wave that has been reflected from a reflector. The time required for the reflected wave to return contains information for the distance between the vehicle 10 and other objects located in the direction in which the laser has been emitted. Each of the LiDAR sensors 12a to 12d outputs the reflected wave information that includes the laser emission direction and the time required for the reflected wave to return, together with the reflected wave information acquisition time at which the laser was emitted, through the in-vehicle network 23 to the object detector 18. At the object detector 18, the reflected wave information is used for processing to detect other objects surrounding the vehicle 10.

The positioning information receiver 13 outputs positioning information that represents the current location of the vehicle 10. The positioning information receiver 13 may be a GNSS receiver, for example. The positioning information receiver 13 outputs positioning information and the positioning information acquisition time at which the positioning information has been acquired, to the map information storage device 14 and navigation device 15, each time positioning information is acquired at a predetermined receiving cycle.

The map information storage device 14 stores wide-area map information for a relatively wide area (an area of 10 to 30 km$^2$, for example) that includes the current location of the vehicle 10. The wide-area map information preferably has high precision map information including three-dimensional information for the road surface, information for the types and locations of structures and road features such as road lane marking lines, and the legal speed limit for the road. The map information storage device 14 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 13, the map information storage device 14 refers to the stored wide-area map information and outputs map information for a relatively narrow area including the current location represented by the positioning information (for example, an area of 100 m to 10 km$^2$), through the in-vehicle network 23 to the location estimating device 17, the object detector 18 and the lane change planning device 22.

Based on the navigation map information, the destination location of the vehicle 10 input through the UI 16, and positioning information representing the current location of the vehicle 10 input from the positioning information receiver 13, the navigation device 15 creates a traveling route from the current location to the destination location of the vehicle 10. The traveling route includes information relating to the locations of right turns, left turns, merging and branching. When the destination location has been newly set or the current location of the vehicle 10 has exited the traveling route, the navigation device 15 creates a new traveling route for the vehicle 10. Every time a traveling route is created, the navigation device 15 outputs the traveling route to the location estimating device 17 and lane change planning device 22, via the in-vehicle network 23.

The UI 16 is an example of the notification unit. The UI 16, controlled by the navigation device 15 and lane change planning device 22, notifies the driver of the vehicle 10 traveling information and a control change notification indicating that control of the vehicle 10 is to change from automatic control to manual control. The UI 16 also creates an operation signal in response to operation of the vehicle 10 by the driver. The traveling information of the vehicle 10 includes information relating to the location of the vehicle and the current and future route of the vehicle, such as the traveling route. The UI 16 has a display device 161 such as a liquid crystal display or touch panel, for display of the traveling information and control change notification. The UI 16 also has a touch panel or operating button, for example, as an input device for inputting operation information from the driver to the vehicle 10. The operation information may be, for example, a destination location, transit points, vehicle speed or other vehicle control information. The UI 16 notifies the navigation device 15, the drive planning device 20 and the lane change planning device 22 of the input operation information, via the in-vehicle network 23.

The location estimating device 17 estimates the location of the vehicle 10 at the camera image photograph time, based on the road features surrounding the vehicle 10 represented in the camera image. For example, the location estimating device 17 compares lane marking lines identified in the camera image with lane marking lines represented in the map information input from the map information storage device 14, and determines the estimated location and estimated declination of the vehicle 10 at the camera image photograph time. The location estimating device 17 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 17 gives notification of this information to the object detector 18, traveling lane planning device 19, drive planning device 20, vehicle control device 21 and lane change planning device 22.

The object detector 18 detects other objects around the vehicle 10 and their types (for example, vehicles) based on the camera image and reflected wave information. Other objects also include other vehicles traveling around the vehicle 10. The object detector 18 tracks other detected objects and determines the trajectories of the other objects. In addition, the object detector 18 identifies the traveling lanes in which the other objects are traveling, based on the lane marking lines represented in the map information and the locations of the objects. The object detector 18 notifies the traveling lane planning device 19 and drive planning device 20 of information representing the types of other objects that were detected, information indicating their locations, and also their traveling lanes.

At a traveling lane-planning creation time set in a predetermined cycle, the traveling lane planning device 19 selects a traffic lane on the road on which the vehicle 10 is traveling, within the nearest driving zone (for example, 10 km) selected from the traveling route as input from the navigation device 15, based on the map information, the traveling route and surrounding environment information and the current location of the vehicle 10, and creates a traveling lane plan representing the scheduled traveling lane for traveling of the vehicle 10. For example, the traveling lane planning device 19 creates a traveling lane plan for the vehicle 10 to travel on a traffic lane other than a passing traffic lane. Each time a traveling lane plan is created, the traveling lane planning device 19 notifies the drive planning device 20 and lane change planning device 22 of the traveling lane plan.

The traveling lane planning device 19 also assesses whether or not a lane change is necessary within the nearest driving zone selected from the traveling route, based on the map information, the traveling route and the current location of the vehicle 10. The traveling lane planning device 19 may further utilize surrounding environment information or vehicle status information for assessment of whether or not a lane change is necessary. The surrounding environment information includes the locations and speeds of other vehicles traveling around the vehicle 10. The vehicle status information includes the current location of the vehicle 10, and the vehicle speed, acceleration and traveling direction. Specifically, the traveling lane planning device 19 assesses whether or not a lane change is necessary for moving to a traffic lane toward the destination location of the vehicle 10, based on the traveling route and the current location of the vehicle 10. Assessment is made of whether or not the vehicle 10 is approaching another road that merges ahead from the traveling route on which it is currently traveling (merge), or the vehicle 10 is exiting onto another road branching ahead from the traveling route (branch). Since merging and branching involve movement of the vehicle from a lane of the traveling route to a lane in another road, they include lane changes.

At a driving plan creation time set with a predetermined cycle, the drive planning device 20 creates a driving plan representing the planned travel trajectory of the vehicle 10 up until a predetermined time (for example, 5 seconds), based on the map information, the traveling lane plan, the current location of the vehicle 10, the surrounding environment information and the vehicle status information. When notification of a lane change plan has been received from the lane change planning device 22, the drive planning device 20 creates the driving plan based on the lane change plan, together with the aforementioned information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. When the traveling lane plan includes a lane change wherein the vehicle 10 is to move between traffic lanes, the drive planning device 20 creates a driving plan that includes the lane change, in such a manner that a predetermined distance can be ensured between the vehicle 10 and other vehicles. When the traveling lane plan includes a lane change wherein the vehicle 10 is to move between traffic lanes, but a predetermined distance cannot be ensured between the vehicle 10 and another vehicle, the drive planning device 20 creates a driving plan for traveling in the current traffic lane. The drive planning device 20 notifies the vehicle control device 21 of the driving plan for each driving plan created.

The vehicle control device 21 controls each unit of the vehicle 10 based on the location of the vehicle 10 and the vehicle speed and yaw rate, as well as on the driving plan, so that the vehicle 10 travels along the traveling route. For example, the vehicle control device 21 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 21 also outputs a control signal corresponding to a set steering amount, to an actuator (not shown) that controls the steering wheel for the vehicle 10. The vehicle control device 21 also determines the amount of fuel injection according to a set accelerator level, and outputs a control signal corresponding to the amount of fuel injection to a drive unit (not shown) of the engine of the vehicle 10. Alternatively, the vehicle control device 21 may output a control signal corresponding to a set brake level to the brake (not shown) of the vehicle 10.

The vehicle control device 21 has an automatic control operating mode in which the vehicle 10 is operated by automatic control as described above, and a manual control operating mode in which the driver operates the vehicle 10 manually. When the driver has acknowledged the notification of control change from automatic control to manual control, the vehicle control device 21 switches operation of the vehicle 10 from the currently applied automatic control operating mode to manual control operating mode. This allows the driver to operate the vehicle 10 by manual control for the lane change. In the manual control operating mode, at least one operation of the vehicle 10 from among driving, braking and steering is controlled manually. Each time the operating mode is changed, the vehicle control device 21 notifies the lane change planning device 22 of the operating mode after the change.

All or some of the functions of the location estimating device 17, object detector 18, traveling lane planning device 19, drive planning device 20 and vehicle control device 21 are carried out by functional modules executed by a computer program operating on a processor, for example. Alternatively, all or some of the functions of the location estimating device 17, object detector 18, traveling lane planning device 19, drive planning device 20 and vehicle control device 21 may be carried out by specialized computing circuits. The location estimating device 17, object detector 18, traveling lane planning device 19, drive planning device 20, vehicle control device 21 and lane change planning device 22 were explained above as separate devices, but all or some of them may be constructed in a single device.

The lane change planning device 22 carries out assessment processing whereby it assesses whether or not it is planned to carry out multiple lane changes within a single road, based on a traveling lane plan representing the scheduled lane on which the vehicle 10 is to travel in a predetermined zone of the traveling route. Based on the traveling route, the lane change planning device 22 also carries out end location setting processing in which it sets a scheduled location of lane change completion where multiple lane changes are to be completed, on a destination target lane where the vehicle 10 is to move from the traveling lane on which it is traveling by executing the multiple lane changes. When it is planned to carry out multiple lane changes within a single road, the lane change planning device 22 carries out lane change plan processing in which it creates a lane change plan in a manner so that a first scheduled lane change zone assigned for carrying out a lane change to be carried out afterwards by the vehicle 10, is shorter than a second scheduled lane change zone assigned for carrying out a lane change to be carried out beforehand. When the lane change cannot be executed even after the vehicle 10 has passed the first scheduled lane change zone and the second scheduled lane change zone, the lane change planning device 22 carries out control change processing in which operation of the vehicle 10 is changed from automatic control to manual control. The lane change planning device 22 therefore has a communication interface (IF) 31, a memory 32 and a processor 33. The communication interface 31, memory 32 and processor 33 are connected via signal wires 34.

The communication IF 31 is an example of an in-vehicle communication unit, and it has an interface circuit to connect the lane change planning device 22 with the in-vehicle network 23. That is, the communication IF 31 is connected with the camera 11, LiDAR sensors 12a to 12d, positioning information receiver 13, map information storage device 14, navigation device 15, UI 16, location estimating device 17, object detector 18, traveling lane planning device 19, drive planning device 20 and vehicle control device 21, via the in-vehicle network 23.

The memory 32 is an example of a memory unit, and it has a volatile semiconductor memory and a non-volatile semiconductor memory, for example. The memory 32 stores an application computer program and various data to be used for information processing carried out by the processor 33 of the lane change planning device 22.

The processor 33 comprises one or more CPUs (Central Processing Units) and their peripheral circuits. The processor 33 may also have other computing circuits such as a logical operation unit, numerical calculation unit or graphic processing unit. When the processor 33 has multiple CPUs, it may have a separate memory for each CPU. The processor 33 carries out assessment processing, end location setting processing, lane change plan processing and control change processing.

The processor 33 has an assessment unit 41 that carries out the assessment processing, an end location setting unit 42 that carries out the end location setting processing, a lane change planning unit 43 that carries out the lane change plan processing and a control change unit 44 that carries out the control change processing. Each of the units of the processor 33 are functional modules driven by a computer program operating on the processor 33, for example. Alternatively, each of the units of the processor 33 may be specialized computing circuits in the processor 33.

Figure 5:
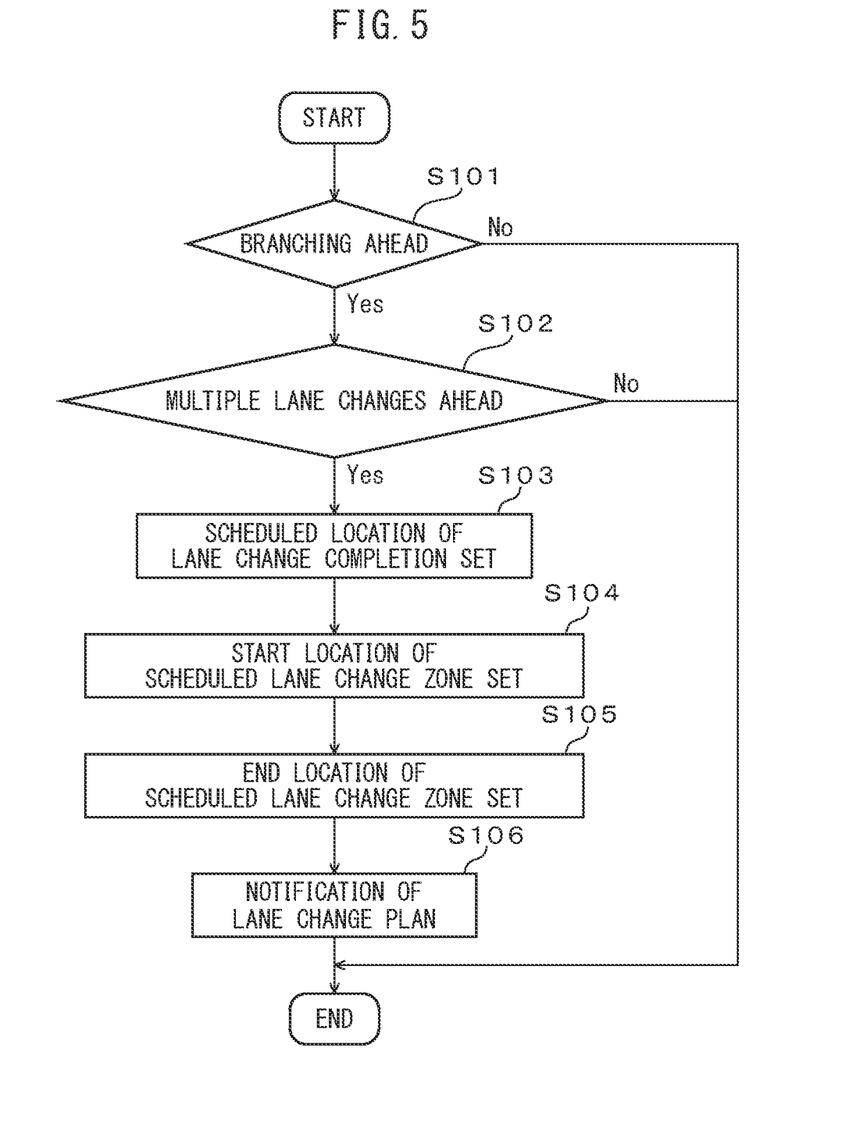
FIG. 5 is an operation flow chart for a lane change planning device.

FIG. 5 is an operation flow chart for the lane change planning device 22. Processing for planning a lane change by the lane change planning device 22 will now be described in detail with reference to FIG. 5. The lane change planning device 22 repeatedly carries out lane change plan processing according to the operation flow chart shown in FIG. 5, while the vehicle 10 is traveling.

First, based on the traveling route 70 notified from the navigation device 15, the assessment unit 41 of the processor 33 of the lane change planning device 22 assesses whether or not a route branch is included within the most recent predetermined distance (zone route) on the traveling route 70 (step 101). When a branching location where the road branches is included in a zone route of the traveling route 70, the assessment unit 41 assesses that a route branch is present. When a branching location is not included in the zone route of the traveling route 70, on the other hand, the assessment unit 41 assesses that no route branch is present. In the example shown in FIG. 1, a branching location B is included in the zone route and the assessment unit 41 therefore assesses that a route branch is present. When no route branch is included (step S101—No), processing by the lane change planning device 22 is completed.

The assessment unit 41 of the processor 33 of the lane change planning device 22 then assesses whether or not it is planned to carry out multiple lane changes within a single road, based on the traveling lane plan notified from the traveling lane planning device 19 (step S102). When multiple lane changes are scheduled in the traveling lane plan for the zone route of the traveling route 70, the assessment unit 41 assesses that multiple lane changes are included in a single road in the traveling lane plan (step S102—Yes). Since four lane changes are included in the example shown in FIG. 2, the assessment unit 41 assesses that multiple lane changes are included in the traveling lane plan. When multiple lane changes are not included in the traveling lane plan, on the other hand (step S102—No), processing by the lane change planning device 22 is completed.

When multiple lane changes are included in the traveling lane plan (step S102—Yes), the end location setting unit 42 of the processor 33 of the lane change planning device 22 refers to the traveling lane plan and map information and sets a scheduled location of lane change completion where the multiple lane changes will be complete (P3 in the example shown in FIG. 3), on the destination target lane (lane 55 in the example shown in FIG. 3) where the vehicle 10 will move by executing multiple lane changes from the traveling lane in which it is traveling (step S103). The scheduled location of lane change completion is the general location for completion of the multiple lane changes, until the scheduled location of lane change completion is reached. The details regarding assessment processing in step S103 will be described with reference to FIG. 6.

The lane change planning unit 43 of the processor 33 of the lane change planning device 22 then sets start locations for the scheduled lane change zones for each of the traffic lanes, based on the scheduled location of lane change completion (step S104). In the example shown in FIG. 3, the start locations of the scheduled lane change zones correspond to Q1 to Q4 for lanes 51 to 54. The details regarding setting processing in step S104 will be described with reference to FIG. 7.

The lane change planning unit 43 of the processor 33 of the lane change planning device 22 then sets an end location for the scheduled lane change zone for each traffic lane, based on the scheduled location of lane change completion (step S105). In the example shown in FIG. 3, the end locations of the scheduled lane change zones correspond to R1 to R4 for lanes 51 to 54. The details regarding setting processing in step S105 will be described with reference to FIG. 8 and FIG. 9. The order of processing in step S104 and processing in step S105 may optionally be reversed. Creation of the lane change plan set by the scheduled lane change zone for each traffic lane is completed between the current location of the vehicle 10 and the scheduled location of lane change completion, based on the processing of step S103 to step S105. In the example shown in FIG. 3, the scheduled lane change zones correspond to A1 to A4 for lanes 51 to 54.

The lane change planning unit 43 then notifies the drive planning device 20 and control change unit 44 of the created lane change plan through the communication IF 31 (step S106), thus completing the series of processing steps. The drive planning device 20 then creates a driving plan based on the lane change plan notified from the lane change planning unit 43 and the traveling lane plan notified from the traveling lane planning device 19. With this series of processing steps, a lane change plan is created whereby the scheduled lane change zones for multiple traffic lanes are shorter as the target lane is approached. By carrying out this manner of lane change plan, the driver can feel that the vehicle is smoothly carrying out multiple lane changes toward the target lane.

Figure 6:
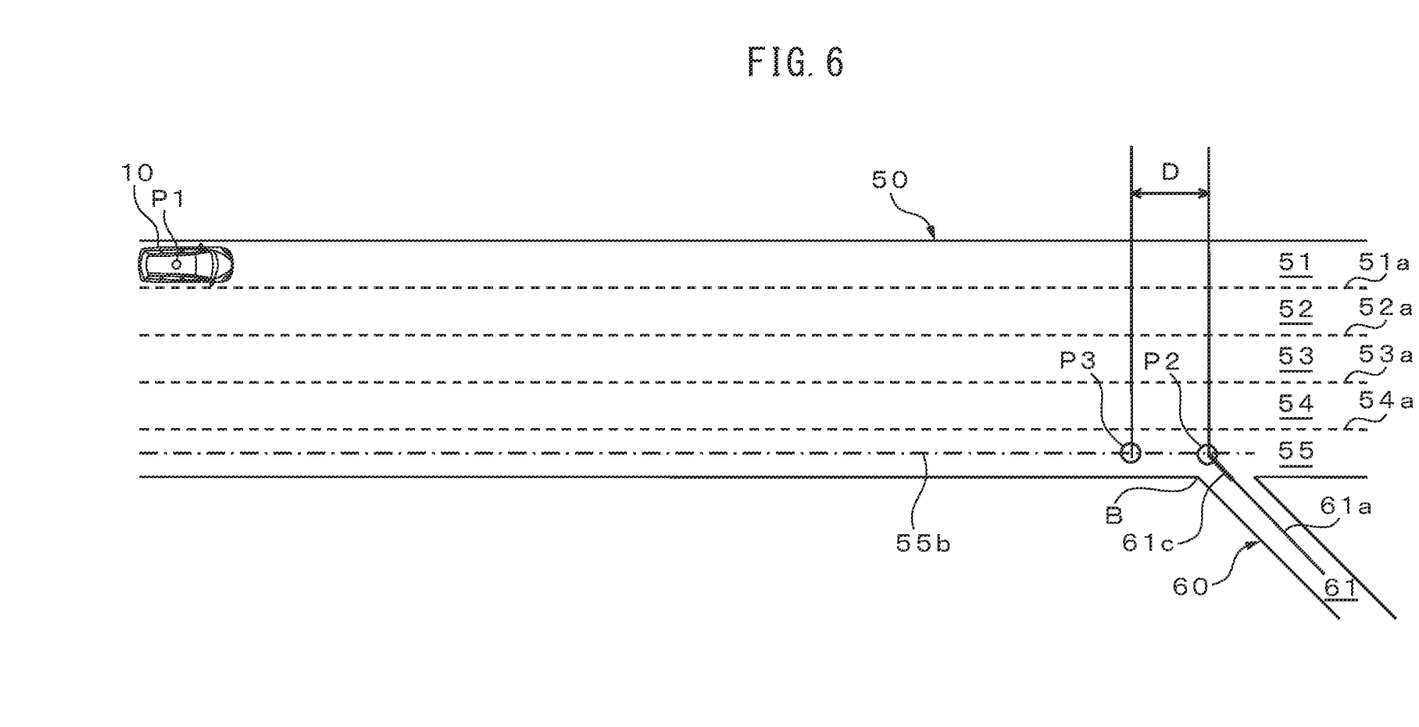
FIG. 6 is a diagram illustrating processing by an end location setting unit.

FIG. 6 is a diagram illustrating processing by an end location setting unit 42. End location setting processing by the end location setting unit 42 in step S103 of FIG. 5 will now be explained in detail with reference to FIG. 6. The end location setting unit 42 refers to the traveling lane plan and map information and detects the center line 55b in a predetermined zone that includes the branching location B of the target lane 55. The end location setting unit 42 refers to the traveling route and the map information and detects the center line 61a of the traffic lane 61 in a predetermined zone that includes the branching location B of the side road 60. The end location setting unit 42 also determines the intersection P2 between an extension line 61c extending the center line 61a of the traffic lane 61 of the side road 60 to the target lane 55, and the center line 55b of the target lane 55.

The end location setting unit 42 determines the scheduled location of lane change completion P3 to be a location toward the current location P1 of the vehicle 10 from the intersection P2 by the predetermined distance D along the traffic lane 55. The end location setting unit 42 may also set the scheduled location of lane change completion P3 so that the time required for the vehicle 10 to reach the intersection P2 through the scheduled location of lane change completion P3 is a predetermined time (such as 2 to 5 seconds), based on the most recent average value for the speed of the vehicle 10. The end location setting unit 42 may also set the intersection P2 to be the scheduled location of lane change completion P3.

Figure 7:
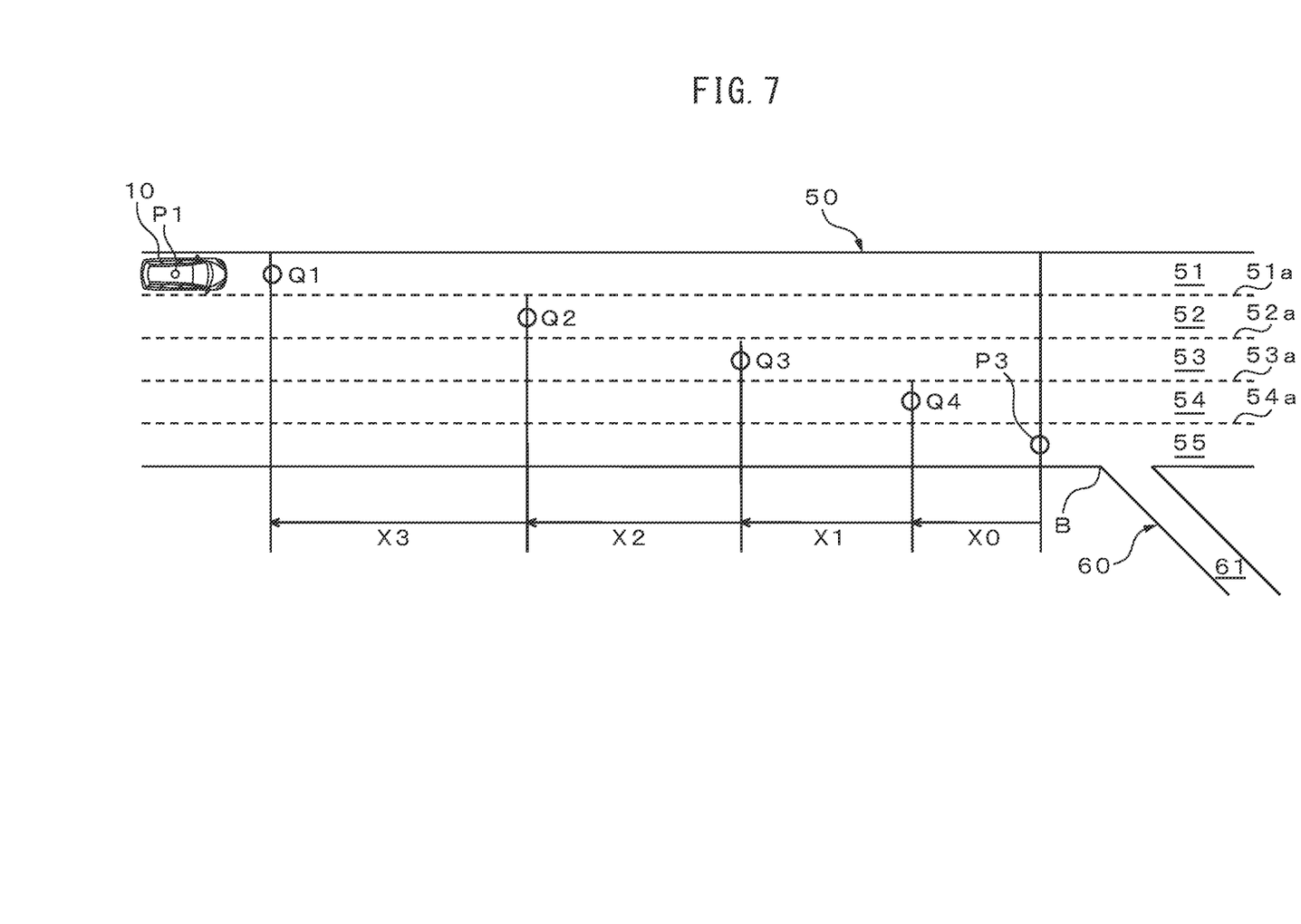
FIG. 7 is a diagram illustrating processing by a lane change planning unit (1).

FIG. 7 is a diagram illustrating processing by the lane change planning unit 43. Processing for setting the start location of the scheduled lane change zone of the lane change planning unit 43 in step S104 of FIG. 5 will now be explained in detail with reference to FIG. 7. The lane change planning unit 43 first refers to the traveling lane plan and map information, setting the start location Q4 as a location from the scheduled location of lane change completion P3 toward the current location P1 of the vehicle 10 by a predetermined distance X0 along the traffic lane 54.

The lane change planning unit 43 may also select the distance X0 from among multiple candidate lengths in ranges that are shorter than the distance between the current location P1 of the vehicle 10 and the scheduled location of lane change completion P3. The lane change planning unit 43 may also set the start location Q4 so that the ratio between a first time estimated to be required for the vehicle 10 to reach the location that lines up directly with the scheduled location of lane change completion P3 on the traffic lane 51 from the current location P1, and a second time estimated to be required for the vehicle 10 to reach the location that lines up directly with the scheduled location of lane change completion P3 on the traffic lane 54 from the start location Q4, is a predetermined ratio (such as 10:1 to 4:1), based on the most recent average value for the speed of the vehicle 10.

Based on the distance X0, the lane change planning unit 43 successively sets start locations Q1 to Q3 in the scheduled lane change zones for the other lanes 51 to 53, on each of the lanes 51 to 53.

Specifically, the lane change planning unit 43 sets distances Xn between the start locations on the other lanes 51 to 53, according to the following formula (1).

$$Xn = K(n) \times X0 \qquad (1)$$

K(n) is set so that Xn>Xn+1. For example, K(n)<K(n+1), and n is an integer of 0 or greater such as 0, 1 or 2. K(n) may be such that K(1)=1.1, K(2)=1.2, K(3)=1.3.

The lane change planning unit 43 calculates the distance X1 along the traffic lane 53, between the start location Q3 on the traffic lane 53 and the start location Q4 on the traffic lane 54, by the formula: X1=K(1)×X0. The lane change planning unit 43 then calculates the distance X2 along the traffic lane 52, between the start location Q2 on the traffic lane 52 and the start location Q3 on the traffic lane 53, by the formula: X2=K(2)×X0. The lane change planning unit 43 then calculates the distance X3 along the traffic lane 51, between the start location Q1 on the traffic lane 51 and the start location Q2 on the traffic lane 52, by the formula: X3=K(3)×X0. Distance X2 is set to be shorter than distance X3, distance X1 is set to be shorter than distance X2, and distance X0 is set to be shorter than distance X1.

Figure 8:
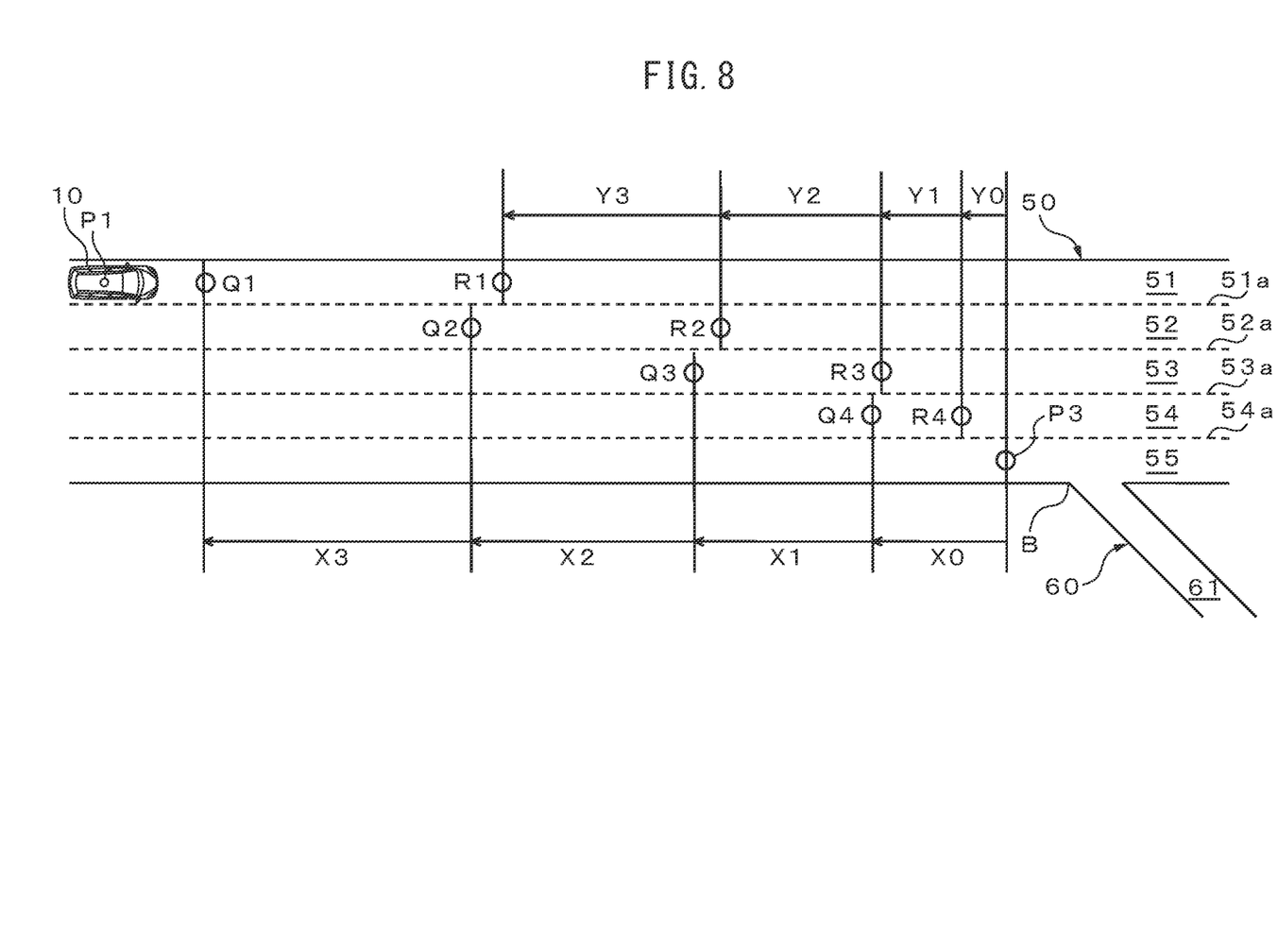
FIG. 8 is a diagram illustrating processing by a lane change planning unit (2).

FIG. 8 is a diagram illustrating processing by the lane change planning unit 43. Processing for setting the end location of the scheduled lane change zone of the lane change planning unit 43 in step S105 of FIG. 5 will now be explained in detail with reference to FIG. 8.

The lane change planning unit 43 first refers to the map information, setting the end location R4 as a location from the first scheduled location of lane change completion P3 toward the current location P1 of the vehicle 10 by a predetermined distance Y0 along the traffic lane 54. The distance Y0 is set to be shorter than the distance X0.

The lane change planning unit 43 selects distance Y0 from among multiple candidate lengths, in a range in which it is shorter than distance X0. The lane change planning unit 43 may also set the end location R4 so that the ratio between a first time estimated to be required for the vehicle 10 to reach the location that lines up directly with the scheduled location of lane change completion P3 on the traffic lane 51 from the current location P1, and a second time estimated to be required for the vehicle 10 to reach the location that lines up directly with the scheduled location of lane change completion P3 on the traffic lane 54 from the end location R4, is a predetermined ratio (such as 13:1 to 6:1), based on the most recent average value for the speed of the vehicle 10.

Based on the distance Y0, the lane change planning unit 43 successively sets end locations R1 to R3 in the scheduled lane change zones for the other lanes 51 to 53, on each of the lanes 51 to 53.

Specifically, the lane change planning unit 43 sets distances Yn between the end locations on the other lanes 51 to 53, according to the following formula (2).

$$Ym = L(m) \times Y0 \qquad (2)$$

Ym is set so that the scheduled lane change zone distance is shorter as the target lane 55 side is approached. For example, L(m)<L(m+1), and m is an integer of 0 or greater such as 0, 1 or 2. L(m) may be such that L(1)=1.1, L(2)=1.2 and L(3)=1.3.

The lane change planning unit 43 calculates the distance Y1 along the traffic lane 53, between the end location R3 on the traffic lane 53 and the end location R4 on the traffic lane

54, by the formula: $Y1=L(1)\times Y0$. The lane change planning unit 43 calculates the distance Y2 between the end location R2 on the traffic lane 52 and the end location R3 on the traffic lane 53 along the traffic lane 52, by the formula: $Y2=L(2)\times Y0$. The lane change planning unit 43 calculates the distance Y3 along the traffic lane 51 between the end location R1 on the traffic lane 51 and the end location R2 on the traffic lane 52, by the formula: $Y3=L(3)\times Y0$. Distance Y2 is set to be shorter than distance Y3, distance Y1 is set to be shorter than distance Y2, and distance Y0 is set to be shorter than distance YL.

Figure 9:
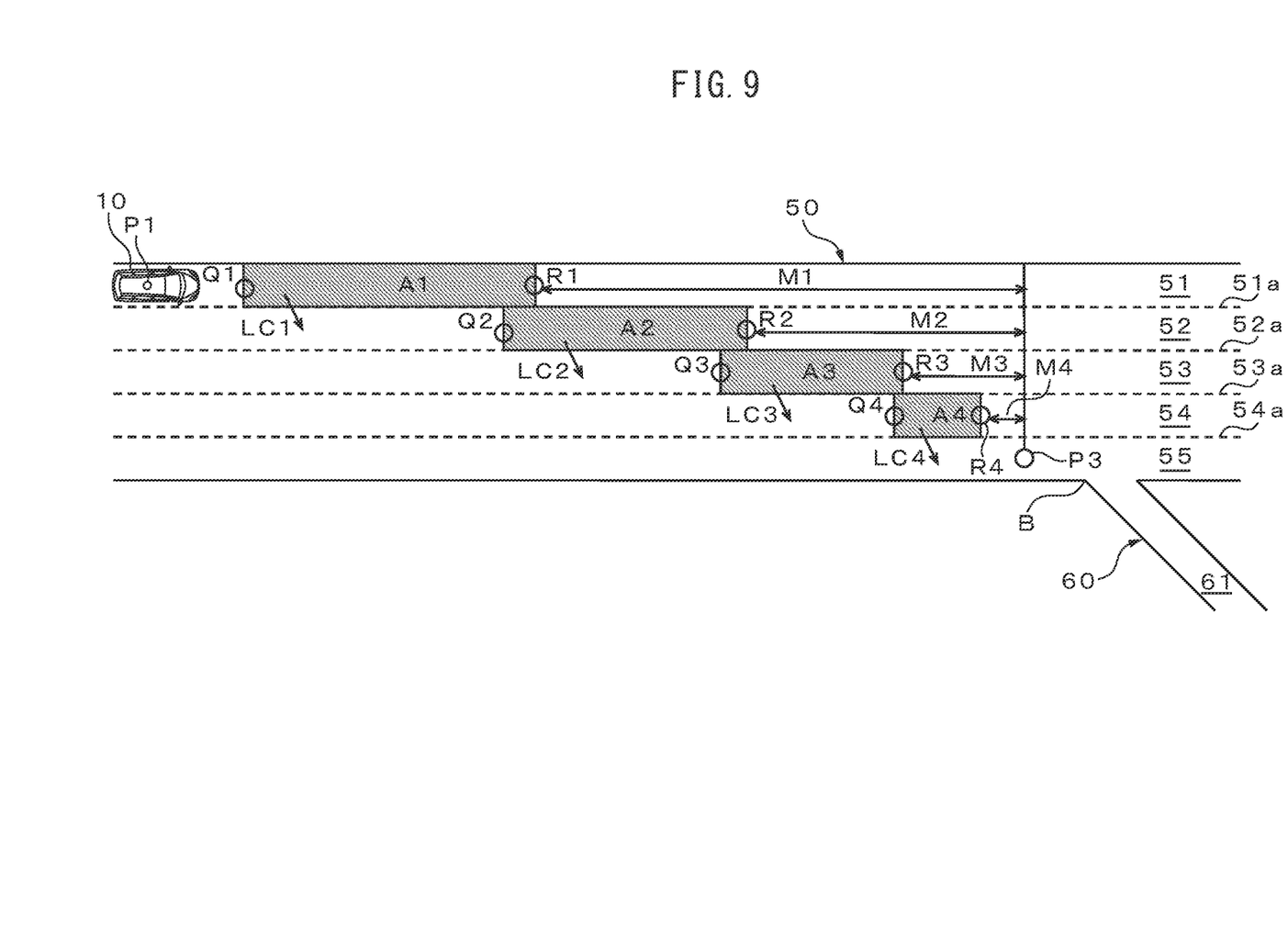
FIG. 9 is a diagram illustrating processing by a lane change planning unit (3).

FIG. 9 is a diagram illustrating a lane change plan created by the lane change planning unit 43. In FIG. 9, manually controlled scheduled lane change zones M1 to M4 are also shown, in addition to those in FIG. 3.

Since the start locations and end locations of the scheduled lane change zones are previously set by step S104 and S105 shown in FIG. 3, the scheduled lane change zones are defined as a result. Specifically, for traffic lane 54, the section between the start location Q4 and the end location R4 is an automatically controlled scheduled lane change zone A4 in which a lane change is carried out by automatic control, and for traffic lane 53, the section between the start location Q3 and the end location R3 is an automatically controlled scheduled lane change zone A3 in which a lane change is carried out by automatic control. Similarly, for traffic lane 52, the section between the start location Q2 and the end location R2 is an automatically controlled scheduled lane change zone A2 in which a lane change is carried out by automatic control, and for traffic lane 51, the section between the start location Q1 and the end location R1 is an automatically controlled scheduled lane change zone A1 in which a lane change is carried out by automatic control. The automatically controlled scheduled lane change zone A4 is set to be shorter than the automatically controlled scheduled lane change zone A3, the automatically controlled scheduled lane change zone A3 is set to be shorter than the automatically controlled scheduled lane change zone A2, and the automatically controlled scheduled lane change zone A2 is set to be shorter than the automatically controlled scheduled lane change zone A1.

In the traffic lane 54, the section between the end location R4 and the location along the scheduled location of lane change completion P3 becomes the manually controlled scheduled lane change zone M4 in which a lane change is carried out by manual control, and in the traffic lane 53, the section between the end location R3 and the location along the scheduled location of lane change completion P3 becomes the manually controlled scheduled lane change zone M3 in which a lane change is carried out by manual control. Similarly, in the traffic lane 52, the section between the end location R2 and the location along the scheduled location of lane change completion P3 becomes the manually controlled scheduled lane change zone M2 in which a lane change is carried out by manual control, and in the traffic lane 51, the section between the end location R1 and the location along the scheduled location of lane change completion P3 becomes the manually controlled scheduled lane change zone M1 in which a lane change is carried out by manual control. The manually controlled scheduled lane change zone M4 is set to be shorter than the manually controlled scheduled lane change zone M3, the manually controlled scheduled lane change zone M3 is set to be shorter than the manually controlled scheduled lane change zone M2, and the manually controlled scheduled lane change zone M2 is set to be shorter than the manually controlled scheduled lane change zone M1.

Operation for lane change by the vehicle 10 will now be explained with reference to FIG. 9.

In the first operation example, the vehicle 10 moves along the trajectory indicated by 90 (refer to FIG. 3), based on the lane change plan shown in FIG. 9, executing four lane changes to move to the target lane 55 before the scheduled location of lane change completion P3.

For a second operation example, it is assumed that the vehicle 10 could not carry out the lane change to traffic lane 52 within the automatically controlled scheduled lane change zone A1 of the traffic lane 51, because a safe distance could not be maintained between the vehicle 10 and another vehicle. The control change unit 44 of the processor 33 of the lane change planning device 22 assesses whether or not the vehicle 10 has reached the end location on each traffic lane, based on the current location P1 of the vehicle 10, the map information and the end location on each traffic lane, at an assessment time in a predetermined cycle. When the vehicle 10 has reached the end location R1 on the traffic lane 51, the control change unit 44 of the processor 33 of the lane change planning device 22 switches operation of the vehicle 10 from automatic control to manual control. The control change unit 44 notifies the vehicle control device 21 of a control switching request for switching of control of the vehicle 10 from automatic control to manual control. When the vehicle control device 21 is notified of the control switching request from the control change unit 44, it switches the operating mode from automatic control operating mode to manual control operating mode. The control change unit 44 also notifies the driver with the control change notification indicating that control of the vehicle 10 has been switched from automatic control to manual control, by display using the display device 161 of the UI 16.

The driver operates the vehicle 10 by manual control while carefully noting the situation surrounding the vehicle 10, making a lane change from the traffic lane 51 to the traffic lane 52. The operating mode of the vehicle 10 is kept in manual control operating mode even if the location where the vehicle 10 has moved from the traffic lane 51 to the traffic lane 52 is in the automatically controlled scheduled lane change zone A2. When the vehicle 10 is in manual control operating mode, the manual control operating mode is maintained as long as a control change operation to automatic control operating mode is not carried out by the driver. Similarly, when the vehicle 10 has been unable to make a lane change in the automatically controlled scheduled lane change zones A2 to A4 on lanes 52 to 54, the control change unit 44 notifies the vehicle control device 21 of the control switching request to switch control of the vehicle 10 from automatic control to manual control.

Since the distances of the manually controlled scheduled lane change zones M1 to M4 are longer toward the traveling lane 51 end, the driver can easily carry out the lane changes while carefully noting the situation surrounding the vehicle 10. After moving to the target lane 55, the driver operates the vehicle 10 so that it moves to the side road 60.

As explained above, the lane change planning device assesses whether or not it has been planned to carry out multiple lane changes within a single road, based on a traveling lane plan that represents a lane on which the vehicle 10 is to travel within a predetermined zone of a traveling route toward the destination location of the vehicle 10, and when it has been planned to carry out multiple lane changes within a single road, it creates a lane change plan such that a first scheduled lane change zone that the vehicle 10 has been assigned for a lane change to be carried out afterwards, is shorter than a second scheduled lane change zone that has been assigned for a lane change to be carried out beforehand. The lane change planning device can thus create a lane change plan in a manner so that the driver feels that the vehicle is smoothly carrying out multiple lane changes toward the target lane, when it is planned to carry out multiple lane changes within a single road.

In the embodiment described above, the target lane was a traffic lane connected to a road branching ahead to which the vehicle is to move from the current traveling road. However, the target lane may be another traffic lane within the road in which the vehicle is traveling. When a priority lane (such as a carpool lane) is included in the road on which the vehicle is traveling, the priority lane may be used as the target lane.

The lane change planning device, the storage medium that stores a computer program for lane change planning and the method for lane changing according to the embodiment of the invention may incorporate appropriate modifications that are still within the gist of the invention. Moreover, the technical scope of the invention is not limited to this embodiment, and includes the invention and its equivalents as laid out in the Claims.

The invention claimed is:

1. A lane change planning device, comprising:
a memory storing instructions; and
a processor communicatively coupled to the memory, wherein the processor is configured to execute the instructions to:
  assess whether to plan to carry out multiple lane changes within a single road, based on a traveling lane plan that represents a lane on which a vehicle is scheduled to travel within a predetermined zone of a traveling route toward a destination location of the vehicle; and
  based on an assessment to plan to carry out the multiple lane changes within the single road, create a lane change plan indicating a first lane change in a first scheduled lane change zone and a second lane change in a second scheduled lane change zone, the first scheduled lane change zone corresponding to the first lane change to be carried out by the vehicle, the second scheduled lane change zone corresponding to the second lane change to be carried out by the vehicle, the first lane change being scheduled to be carried out after the second lane change, the first scheduled lane change zone being shorter than the second scheduled lane change zone.

2. The lane change planning device according to claim 1, wherein the processor is further configured to execute further instructions to:
  decrease a distance between a first start location of the first scheduled lane change zone and a second start location of the second scheduled lane change zone as a number of lane changes that have been executed increases.

3. The lane change planning device according to claim 2, wherein the processor is further configured to execute further instructions to:
  set, based on the traveling route and the traveling lane plan, a scheduled location of lane change completion indicating a destination target lane after the multiple lane changes have been carried out from a traveling lane; and
  set, based on the scheduled location of the lane change completion, the first start location of the first scheduled lane change zone on a first traffic lane and the second start location of the second scheduled lane change zone on a second traffic lane.

4. The lane change planning device according to claim 3, wherein the processor is further configured to execute further instructions to:
  set, based on the scheduled location of the lane change completion, a first end location of the first scheduled lane change zone the first traffic lane and a second end location of the second scheduled lane change zone on the second traffic lane.

5. The lane change planning device according to claim 3, wherein the processor is further configured to execute further instructions to:
  switch operation of the vehicle from automatic control to manual control when the vehicle remains in a current lane after passing at least one of the first scheduled lane change zone and the second scheduled lane change zone.

6. The lane change planning device according to claim 1, wherein the processor is further configured to execute further instructions to:
  determine an intersection between a first center line of a destination lane after the multiple lane changes have been carried out and a second center line of a target lane of the destination location of the vehicle;
  determine the first scheduled lane change zone based on a first predetermined distance from the intersection; and
  determine the second scheduled lane change zone based on a second predetermined distance from the intersection.

7. The lane change planning device according to claim 1, wherein:
  the lane change plan further indicates a third lane change in a third scheduled lane change zone,
  the third scheduled lane change zone corresponds to the third lane change to be carried out by the vehicle,
  the second lane change is scheduled to be carried out after the third lane change,
  the second scheduled lane change zone is being shorter than the third scheduled lane change zone, and
  a first time lag between the second lane change and the first lane change is shorter than a second time lag between the third lane change and the second lane change.

8. A lane change planning device, comprising:
a memory storing instructions; and
a processor communicatively coupled to the memory, wherein the processor is configured to execute the instructions to:
  assess whether to plan to carry out multiple lane changes within a single road, based on a traveling lane plan that represents a lane on which a vehicle is scheduled to travel within a predetermined zone of a traveling route toward a destination location of the vehicle; and
  based on an assessment to plan to carry out the multiple lane changes within the single road, create a lane change plan indicating a scheduled lane change zone assigned to the vehicle corresponding to a lane change of the multiple lane changes, a length of the scheduled lane change zone decreasing as a number of executed lane changes increases.

9. A non-transitory computer-readable storage medium storing a computer program for lane change planning that, when executed by a processor of a lane change planning device, causes the lane change planning device to:
  assess whether to plan to carry out multiple lane changes within a single road, based on a traveling lane plan that represents a lane on which a vehicle is to travel within a predetermined zone of a traveling route toward a destination location of the vehicle; and based on an assessment to plan to carry out the multiple lane changes within the single road, create a lane change plan indicating a first lane change in a first scheduled lane change zone and a second lane change in a second scheduled lane change zone, the first scheduled lane change zone corresponding to the first lane change to be carried out by the vehicle, the second scheduled lane change zone corresponding to the second lane change to be carried out by the vehicle, the first lane change being scheduled to be carried out after the second lane change, the first scheduled lane change zone being shorter than the second scheduled lane change zone.

* * * * *